(12) United States Patent  
Shitano (10) Patent No.: US 8,249,085 B2  
(45) Date of Patent: Aug. 21, 2012

(54) RELAY APPARATUS AND RELAY METHOD

(75) Inventor: Masaki Shitano, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 405 days.

(21) Appl. No.: 12/033,415

(22) Filed: Feb. 19, 2008

(65) Prior Publication Data

US 2008/0219155 A1  Sep. 11, 2008

(30) Foreign Application Priority Data

Mar. 6, 2007  (JP) .................. 2007-055760

(51) Int. Cl.
*H04L 12/56* (2006.01)

(52) U.S. Cl. ........................................... 370/401

(58) Field of Classification Search .......... 370/230, 370/235, 315, 328, 400, 401, 402, 403, 404, 370/405, 420, 428
See application file for complete search history.

(56) References Cited

U.S. PATENT DOCUMENTS

| | | | | |
|---|---|---|---|---|
| 6,563,517 B1* | 5/2003 | Bhagwat et al. | ............... | 715/735 |
| 2002/0059371 A1* | 5/2002 | Jamail et al. | .................. | 709/203 |
| 2002/0065074 A1* | 5/2002 | Cohn et al. | .................... | 455/422 |
| 2003/0099197 A1* | 5/2003 | Yokota et al. | .................. | 370/230 |
| 2004/0044781 A1* | 3/2004 | Hymel et al. | .................. | 709/229 |
| 2006/0221825 A1 | 10/2006 | Okano | | |
| 2008/0151881 A1* | 6/2008 | Liu et al. | ....................... | 370/389 |
| 2008/0172488 A1* | 7/2008 | Jawahar et al. | ............... | 709/225 |

FOREIGN PATENT DOCUMENTS

| | | |
|---|---|---|
| JP | 7-210473 | 8/1995 |
| JP | 2006-287331 A | 10/2006 |
| KR | 10-2004-0104775 | 12/2004 |

* cited by examiner

*Primary Examiner* — Ricky Ngo
*Assistant Examiner* — Wei-Po Kao
(74) *Attorney, Agent, or Firm* — Fitzpatrick, Cella, Harper & Scinto

(57) ABSTRACT

A relay apparatus receives data from a first device via a first network. The relay apparatus then receives a first request from a second device via a second network, and sends a second request to the first network in accordance with the first request. Then, the relay apparatus sends, to the second device via the second network, data received from the first device prior to the first request being received, in accordance with the first request and a communication condition.

19 Claims, 7 Drawing Sheets

RELAY APPARATUS AND RELAY METHOD

BACKGROUND OF THE INVENTION

1. Field of the Invention

The present invention relates to a relay apparatus and a relay method that receives a first request via a network and sends a second request to a different network in response to the first request.

2. Description of the Related Art

Bridges, routers, gateways, and wireless access points are examples of devices that connect plural distributed networks to one another.

These devices block forwarding based on the destination address, protocol, and so on of a transmitted message, or control the priority of a transmitted message based on the type of network from which the transmitted message was sent, the protocol of the transmitted message, and the like. A gateway also performs congestion control and network protocol conversion of transmitted data.

Conventionally, whether to pass on a transmitted message or discard the transmitted message is determined based on the IP address or MAC address of the transmitted data according to Internet Protocol (IP) or based on the type of network protocol.

Furthermore, with the IP and TCP protocols, when a congestion control function is to be implemented by a gateway that has detected a state of congestion or by a computer or home electric appliance connected to the network, the congestion is suppressed in the following manner. First, a request (ICMP source quench) is sent to the computer, home electric appliance, or the like that has sent the transmitted message that is causing the congested state, requesting the computer or appliance to reduce its sending speed. Then, having received this request, the computer or home electric appliance suppresses the congestion by reducing the speed at which the transmission message is being sent, up until the request is no longer received.

For example, in the system for data filtering between transmission paths disclosed in Japanese Patent Laid-Open No. 07-210473, functionality for data filtering between transmission paths is expanded, resulting in the effective utilization of transmission path resources and the expansion of congestion control functionality. Furthermore, the possibility that the latest transmission data will be discarded, due to the suppression of congestions in the transmission path to which the data is to be forwarded, a lack of buffer area in the gateway, and so on, can be reduced when performing congestion control, based on the classification of attributes of the transmission data.

However, there is a problem in that even if control is executed on the TCP or UDP/IP levels while in a congested state, and the congestion is suppressed on such a level, such control may lead to error cases under the rules of an upper protocol, or may violate the rules of that upper protocol. For example, if the upper protocol has a rule in which when a message is sent to a certain end point, the response thereto must be executed within a certain number of seconds, and an error is defined for when the response is not executed within the certain number of seconds, such a situation results in an error case. If not defined as an error, this is nevertheless a violation of the rules of the protocol.

There is another problem that arises when controlling the priority of transmitted messages in mid-network using the protocol type: in a transmission path where various messages are transmitted, although the chance of a specific message being transmitted correctly improves, the chance of arrival for that message cannot be guaranteed.

Furthermore, another problem arises when one of the networks connected to the bridge, router, gateway, or wireless access point becomes incapable of communications: the messages flowing through that network do not arrive at their destinations, and thus the upper protocol does not function.

SUMMARY OF THE INVENTION

It is an object of the present invention to respond to a request received via a network in a short amount of time.

According to one aspect of the present invention, a relay apparatus comprises: a first receiving unit adapted to receive data from a first device via a first network; a second receiving unit adapted to receive a first request from a second device via a second network; a first sending unit adapted to send a second request to the first network in accordance with the first request; and a second sending unit adapted to send, to the second device via the second network, data received from the first device prior to the first request being received, in accordance with the first request and a communication condition.

According to another aspect of the present invention, a relay method comprises the steps of: receiving data from a first device via a first network; receiving a first request from a second device via a second network; sending a second request to the first network in accordance with the first request; and sending, to the second device via the second network, data received from the first device prior to the first request being received, in accordance with the first request and a communication condition.

Further features of the present invention will become apparent from the following description of exemplary embodiments (with reference to the attached drawings).

DESCRIPTION OF THE EMBODIMENTS

An embodiment of the present invention shall be described hereinafter with reference to the drawings. Although specific examples of processes are denoted herein, the present invention is not intended to be limited to these specific examples of processes.

<Diagram of Overall System Configuration>

Figure 1:
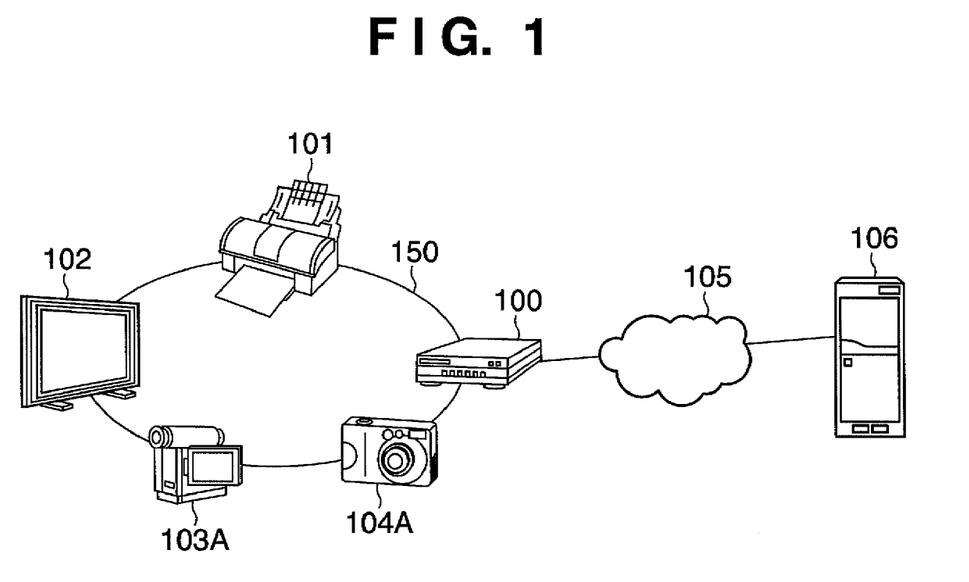
FIG. 1 is a diagram illustrating the configuration of a system embodying the present invention.

FIG. 1 is a diagram illustrating the overall configuration of a system according to an embodiment of the present invention.

As can be seen in FIG. 1, a message relay device (information return device) 100, a printer 101, a digital television 102, a digital video camera 103A, and a digital camera 104A are connected to a network 150. Furthermore, a server 106 is connected to the message relay device 100 via a network 105. The message relay device 100 connects to the networks 105 and 150 and relays messages between the network 105 and the network 150. In the present embodiment, the abovementioned devices (apparatuses) are used as examples, but the embodiment is not intended to be limited thereto. The abovementioned devices each have the necessary resources, such as processing functionality, data holding functionality, and so on needed in order to execute programs, and also have communication functionality for performing communication with control functionality, for controlling the apparatus (device) itself using the stated resources.

<Block Diagram of Apparatus System>

Figure 2:
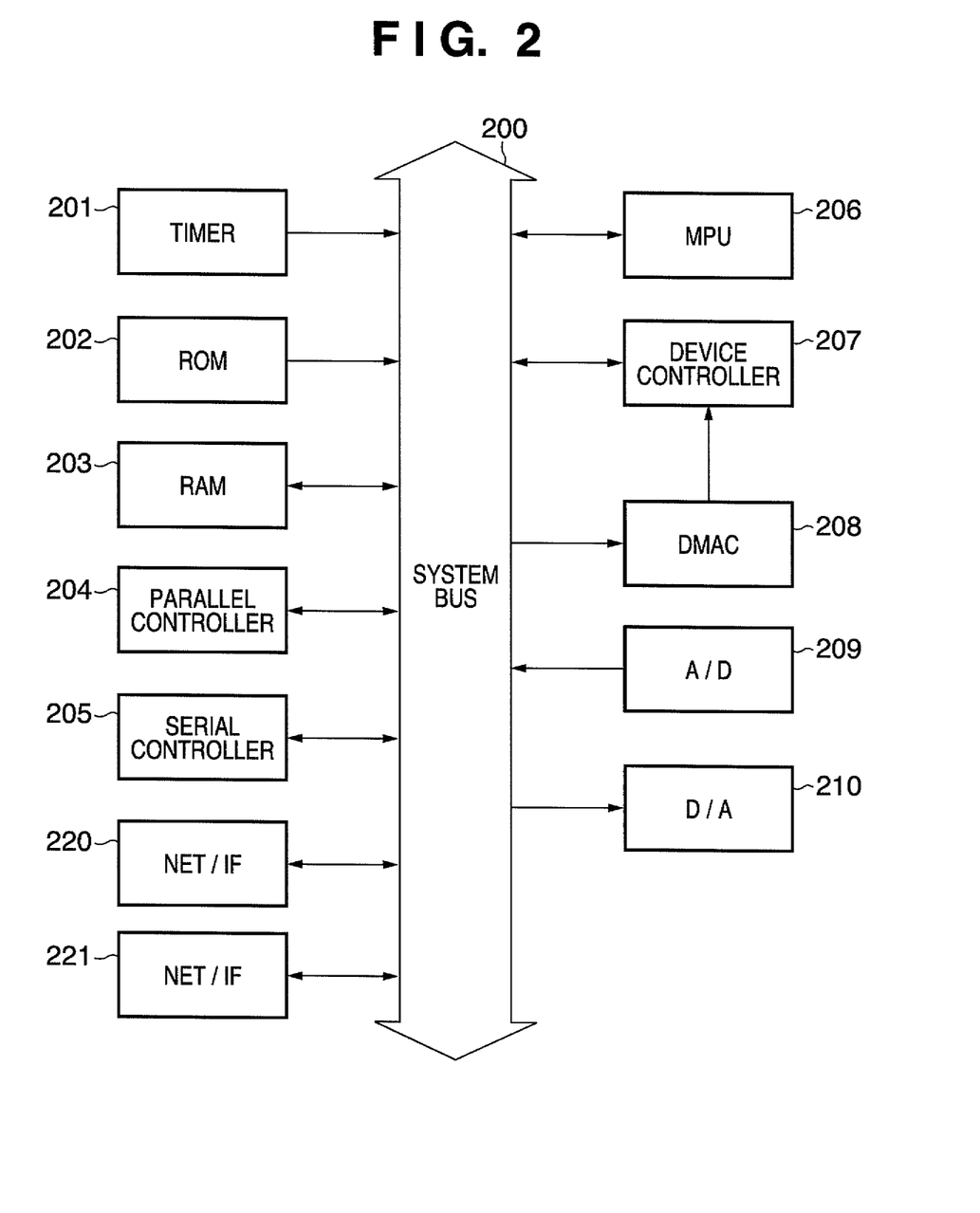
FIG. 2 is a block diagram illustrating an apparatus system embodying the present invention.

FIG. 2 is a block diagram illustrating a general configuration of the hardware system of a device (apparatus), as given as an exemplary embodiment of the present invention. Note that the various apparatuses (devices) described herein are not intended to be limited to the configuration illustrated in FIG. 2.

200 is an input/output bus (address bus, data bus, and control bus) for connecting various units to one another. 201 is a timer that has functionality for issuing an interrupt at specific intervals. The timer 201 also has what is known as watchdog timer functionality, time measurement functionality, and so on.

202 is a ROM (Read-Only Memory), and has functionality for storing program code, fixed data that does not change, and so on. 203 is a RAM (Random Access Memory) that functions as a main memory, and as an area for executed programs, an execution area for those programs, and a data area.

204 is a parallel controller, and has functionality for inputting/outputting parallel data handled within the computer from/to an external device as-is. 205 is a serial controller, and has functionality for outputting parallel data handled within the computer as serial data, and for converting serial data to parallel data and inputting the parallel data.

206 is an MPU (Microprocessor Unit), and has functionality for sequentially executing program commands and executing interrupts.

207 is a device controller, and has functionality for connecting general external input/output device such as hard disks, displays, and the like. 208 is a DMAC (Direct Memory Access Controller), and has functionality for executing control when data is exchanged directly between an internal memory and an external device.

209 is an A/D (analog-to-digital) converter, and has functionality for converting analog data into digital data, digitizing amounts detected by a sensor or the like. 210 is a D/A (digital-to-analog) converter, and has functionality for converting digital data into analog data, turning an operational quantity for an external actuator into analog form or the like.

220 and 221 are network interfaces (NET/IF). The message relay device 100 has two network interfaces for connecting to the networks 150 and 105. The network interfaces 220 and 221 of the message relay device 100 send and receive messages via the networks 150 and 105. Devices aside from the message relay device 100 have a single network interface for connecting to either the network 150 or the network 105.

<Message Relay Device Module Configuration Diagram>

Figure 3:
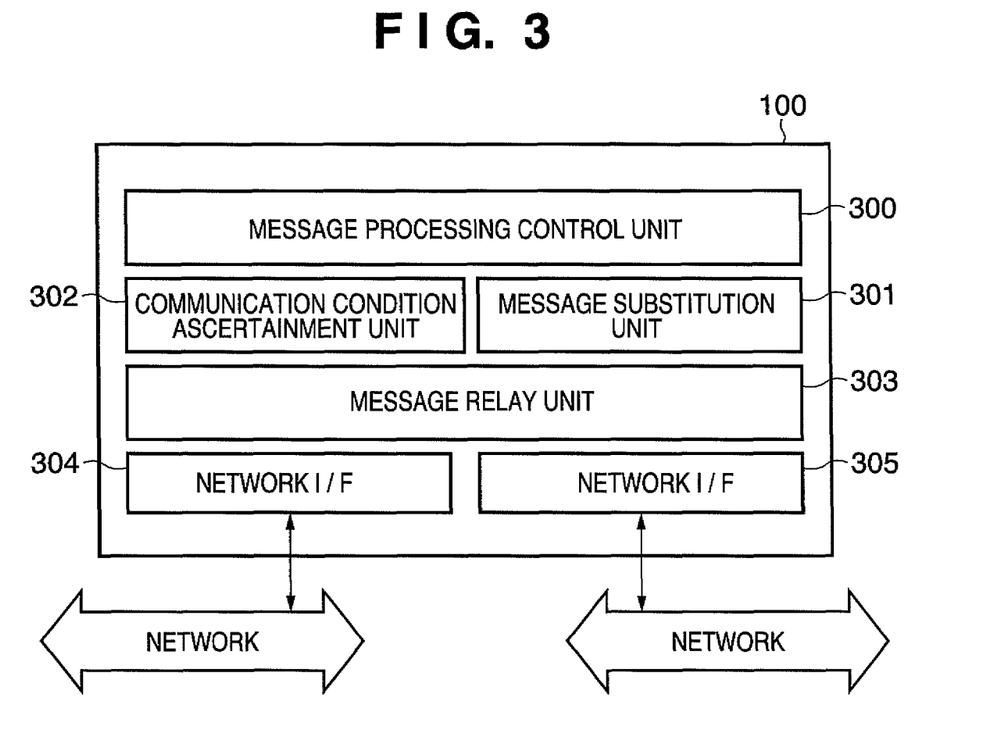
FIG. 3 is a diagram illustrating a module configuration of a message relay device embodying the present invention.

FIG. 3 is a block diagram illustrating a module configuration of the message relay device (information return device) 100 given as an exemplary embodiment of the present invention. This module is a program module implemented by the MPU 206 executing a program stored in the ROM 202 shown in FIG. 2. The program stored in the ROM 202 is a computer program read out by the MPU 206, which is a computer.

The message relay device (information return device) 100 is configured of a message processing control unit 300, a message substitution unit 301, a communication condition ascertainment unit 302, a message relay unit 303, and a network IF (interface) 305.

The message processing control unit 300 controls and exchanges data with the message substitution unit 301, the communication condition ascertainment unit 302, the message relay unit 303, and the network IFs 304, 305.

The message substitution unit 301 determines whether or not to substitute processes performed by apparatuses connected to the network based on the error rate and the protocol type. When this substitution is to be performed, the message substitution unit 301 sends a response message in response to a message received from the network 150. In the present embodiment, the message substitution unit 301 sends a response message in response to a message received from the network 150. This response message is sent based on the error rates in the networks 150 and 105 and the time required for a response to be received from the device via the network 105. Furthermore, the message substitution unit 301 has functionality for emulating the protocol used by the device, in place of the device, and temporarily stores messages in regards to which processing cannot be emulated. In other words, the message substitution unit 301 obtains information via the network 105 (from the server 106).

The communication condition ascertainment unit 302 has functionality for measuring the network error rate, functionality for measuring the response time after a message has been sent to an apparatus connected to the network, and functionality for determining the protocol type.

The message relay unit 303 relays messages between the network 105 and the network 150. To be more specific, the message relay unit 303 sends, to the network 105, a message received via the network 150. Furthermore, the message relay unit 303 sends, to the network 150, a message received from the network 105 (the server 106) based on the communication conditions of the network 150 (and 105).

A network IF 304 and the network IF 305 are network interfaces (NET/IF). The network IFs 304 and 305 have functionality for performing control so as to forward data between information processing devices via the networks 150 and 105, respectively, and functionality for diagnosing network conditions. Furthermore, the network IFs 304 and 305 have functionality for counting their respective numbers of outgoing packets, incoming packets, outgoing packet errors, incoming packet errors, and collision numbers. The network IFs 304 and 305 are connected to the networks 150 and 105, respectively, and receive/send messages via the networks 150 and 105, respectively.

<System Process Flow>

Figure 4:
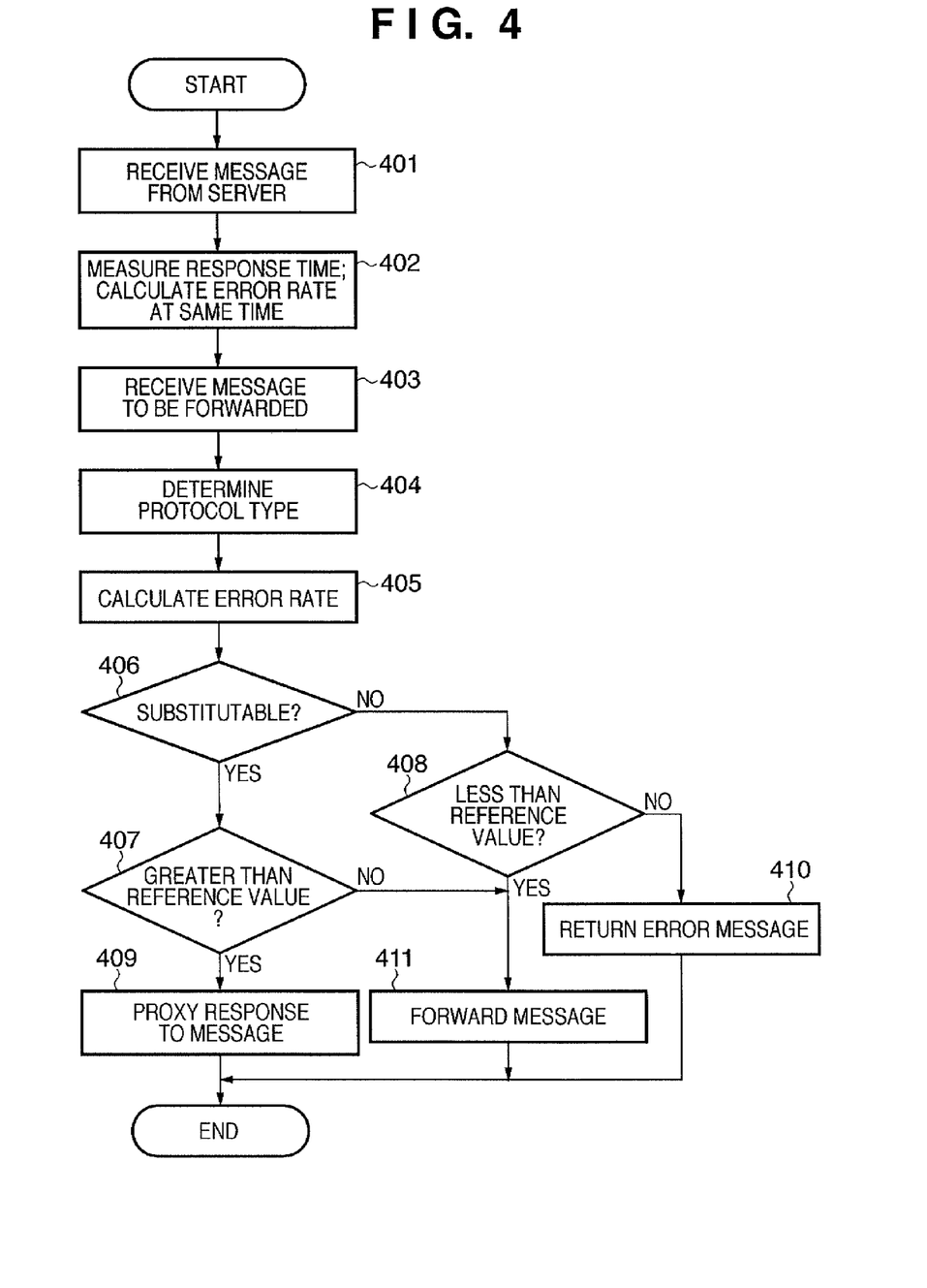
FIG. 4 is a flowchart of a system embodying the present invention.

The flow of the overall process performed by the system embodying the present invention shall be described with reference to FIG. 4. FIG. 4 illustrates part of the program stored in the ROM 202; this program is a computer program read out by the MPU 206, which is a computer.

The following descriptions shall be given using the UPnP protocol as an example. That is, the message relay device (information return device) 100 emulates a digital media server compliant with the UPnP standard using the message substitution unit 301. The message relay device 100 then provides or uploads content from the server 106 to the printer 101, the digital television 102, the digital video camera 103A, and the digital camera 104A, which are UPnP-compliant devices.

Although the UPnP protocol is used as an example here for the sake of clarity, the present invention is not intended to be limited to this protocol.

In Step 401, the message substitution unit 301 of the message relay device (information return device) 100 obtains metadata of the content from the server 106 (that is, receives a message via the network 105). In other words, the message substitution unit 301 obtains information from the server 106 via the network 105. The message substitution unit 301 stores the obtained metadata.

In Step 402, the communication condition ascertainment unit 302 measures the time it takes to receive this response. Furthermore, in Step 402, the communication condition ascertainment unit 302 obtains the number of incoming/outgoing packets through the network IF 305 via the message processing control unit 300, the number of incoming/outgoing errors, and the number of collisions, and calculates the error rate.

The equation used for this calculation is as follows:

$$\text{error rate} = (I\text{errs} + O\text{errs} + \text{Collis})/(I\text{pkts} + O\text{pkts}) * 100$$

(Ierrs: number of incoming packet errors; Oerrs: number of outgoing packet errors; Collis: number of collisions; Ipkts: number of incoming packets; Opkts: number of outgoing packets)

Here, the communication condition ascertainment unit 302 stores and holds the calculated error rate and the response time. As an example, the error rate is assumed to be 10%, and the response time 5 seconds.

In Step 403, from a UPnP-compliant device such as the digital television 102 or the like, the message substitution unit 301 receives, for example, a request message sent for obtaining the content itself or metadata of the content (that is, receives a message via the network 150).

In Step 404, the communication condition ascertainment unit 302 determines the protocol (message).

In Step 405, the communication condition ascertainment unit 302 obtains the abovementioned information from the network IF 304, and calculates the error rate at that point in time using the abovementioned equation.

In Step 406, the message processing control unit 300 determines whether or not the protocol (message) determined in Step 404 can be substituted by the message substitution unit 301. If the protocol is substitutable, the procedure moves to Step 407, whereas if the protocol is unsubstitutable, the procedure moves to Step 408. For example, with a protocol that obtains the metadata of the content, the message substitution unit 301 obtains the metadata in advance, and thus it is determined that the protocol is substitutable; however, with a protocol that obtains the content itself, it is determined that the protocol is unsubstitutable. It should be noted that the determination in Step 406 is unnecessary when a protocol that is always substitutable is used, and thus the procedure moves to Step 407 after Step 405.

Furthermore, while the abovementioned determination is executed in the present embodiment, there are various criteria for determination depending on the protocol, and thus the present embodiment is not limited hereto.

In Step 407, if the error rate calculated in Step 405 is higher than the error rate calculated in Step 402 (or, a reference value), the procedure moves to Step 409; if the error rate calculated in Step 405 is lower than the error rate calculated in Step 402 (or, the reference value), the procedure moves to Step 411.

In Step 409, the message substitution unit 301 does not forward the message received in Step 403 to the server 106, but rather makes a proxy response, as a result of it being determined that the protocol is substitutable, the error rate is high, and the response time exceeds the aforementioned 5 seconds. In other words, the metadata obtained in Step 401 is sent to the source from which the request message was sent. Here, a proxy return is made in the case where the error rate is higher. Furthermore, in Step 409, the message substitution unit 301 sends a response message in response to a message received from the digital television 102 (a request message for obtaining the metadata of the content) based on the communication conditions of the networks 150 and 105. This response message includes the metadata obtained from the server 106 in Step 401. An example of the communication conditions of the networks 150 and 105 is the error rates in the networks 150 and 105 and the time required for a response to be received from the device (the server 106) via the network 105. Furthermore, upon receiving a request for obtaining the information (metadata) from the digital television 102 (Step 403), the message substitution unit 301 returns the information obtained in Step 401 based on the conditions at the time of the information being obtained in Step 401.

Note that the criteria for determining whether or not to forward the message as described in Step 407 are not limited to the example given above. For example, (time limit until digital television 102 receives metadata (e.g. 30 seconds))≧ (response time when message relay device 100 receives metadata from server 106 in Step 401 (in the above example, 5 seconds))+(estimated round-trip time between digital television 102 and message relay device 100).

However, (estimated round-trip time between digital television 102 and message relay device 100)=(response time when message relay device 100 receives metadata from server 106 in Step 401)×(error rate when message relay device 100 receives request from digital television 102 in Step 403)/(error rate when message relay device 100 receives metadata from server 106 in Step 401).

In Step 411, the error rate in Step 407 is lower, and thus substitution is possible; therefore, it is determined that the chance of the response time exceeding 5 seconds is low. As a result, the message (metadata obtainment request message) is forwarded by the message relay unit 303 to the server 106 as-is. Then, upon receiving the message, the server 106 returns a response. The message relay unit 303 sends that response, via the network 150, to the source of the message received in Step 403. In other words, the message relay unit 303 sends, to the network 150 (the digital television 102), the message received from the network 105 (the server 106) based on the communication conditions of the network 150 (and 105). To put it differently, when the message substitution unit 301 has received a request for obtaining the information via the network 150 (from the digital television 102), the message substitution unit 301 newly obtains information in Step 411 and returns this obtained information based on the conditions at the time of the information being obtained in Step 401.

Note that in the case where a proxy response is made is Step 409, the request message is forwarded, and the saved information may be updated in preparation for the next request.

According to another configuration, if the conditions when the message is received from the server 106 in Step 401 are good, it is determined that an appropriate response is to be returned to the source of the message in Step 403, even if the message received in Step 403 is sent to the network 105. The procedure then moves from Step 407 to Step 411. If the conditions are not good, the procedure moves from Step 407 to Step 409. Here, the source of the message in Step 403 is the digital television 102. Moreover, the conditions when the message is received from the server 106 being good refers to, for example, the quality of communication in the network 105 being good (e.g., when the response time is less than a predetermined value). In Step 407, the message processing control unit 300 selects between sending the message received in Step 403 to the network 105 and sending a message to the network 150 in accordance with the message received in Step 401. In other words, in Step 407, the message processing control unit 300 selects between forwarding the message (Step 411) and making a proxy response (Step 409).

According to yet another configuration, if the communication conditions of the network 150 as measured in Step 405 are good, it is determined that an appropriate response is to be returned to the source of the message in Step 403, even if the message received in Step 403 is sent to the network 105. Then, the message received via the network 150 is sent to the network 105. If the conditions are not good, the procedure moves from Step 407 to Step 409. Here, the source of the message in Step 403 is the digital television 102. Moreover, the communication conditions of the network 150 being good refers to, for example, the error rate of the message from the digital television 102 being no greater than a predetermined value. In Step 407, the message processing control unit 300 selects between sending the message received in Step 403 to the network 105 and sending a message to the network 150 in accordance with the message received in Step 401. In other words, in Step 407, the message processing control unit 300 selects between forwarding the message and making a proxy response.

According to yet another configuration, if the communication conditions of the network 105 as measured in Step 405 are good, it is determined that an appropriate response is to be returned to the source of the message in Step 403, even if the message received in Step 403 is sent to the network 105. Then, the message received via the network 150 is sent to the network 105. If the conditions are not good, the procedure moves from Step 407 to Step 409. Here, the source of the message in Step 403 is the digital television 102. Moreover, the conditions when the message is received from the server 106 being good refers to, for example, the quality of communication in the network 105 being good (e.g., when the response time is less than a predetermined value). In order to determine the quality of communication in the network 105, in Step 405, the communication condition ascertainment unit 302 sends a message to the server 106 and measures the amount of time it takes for a response thereto to return. In Step 407, the message processing control unit 300 selects between sending the message received in Step 403 to the network 105 and sending a message to the network 150 in accordance with the message received in Step 401. In other words, in Step 407, the message processing control unit 300 selects between forwarding the message and making a proxy response.

In Step 408, if it has been determined in Step 406 that the protocol is unsubstitutable, the procedure moves to Step 411 in the case where the error rate calculated in Step 405 is lower than the error rate calculated in Step 402 (or, a reference value), whereas the procedure moves to Step 410 in the case where the error rate calculated in Step 405 is greater than the error rate calculated in Step 402.

In Step 411, the message relay unit 303 forwards the message received in Step 403 to the server 106 as-is, as a result of it being determined that the protocol is unsubstitutable, the error rate is low, and the chance of the response time exceeding the aforementioned 5 seconds is low. Here, the message received in Step 403 is a content obtainment request message.

In Step 410, the protocol is unsubstitutable, the error rate is high, and thus the chance of the response time exceeding the aforementioned 5 seconds is high; therefore, the message substitution unit 301 returns an error message. In other words, the message substitution unit 301 sends an error message in response to the message received from the network 150, based on the communication conditions of the networks 150 and 105 and the protocol used by the message received from the digital television 102. Furthermore, the message substitution unit 301 selects between sending a message to the network 150 in accordance with the message received in Step 401 and sending an error message, based on the protocol used by the message received in Step 403. Alternatively, the message substitution unit 301 selects between making a proxy response (Step 409) and sending an error message to the network 150 (Step 410), based on the protocol used by the message received in Step 403.

In the present embodiment, a response message is sent in accordance with a message received from the network 150, based on the communication conditions of the network 150. Therefore, if the communication conditions of the network 150 (or the network 105) are poor, and there is not enough time to forward a message to the server 106 via the network 105 and wait for a response from the server 106, a response message can be sent using the information obtained in Step 401.

In addition, when a request for obtaining the information has been received via the network 150 (Step 403), the information already obtained in Step 401 is returned, based on the conditions at the time of the information being obtained in Step 401. Therefore, if it takes too much time when the information is obtained from the server 106 via the network 105, and there is not enough time to newly obtain information from the server 106 via the network 105, the already-obtained information can be returned. If, however, it has not taken too much time when the information is obtained from the server 106 via the network 105, there is enough time to newly obtain information from the server 106 via the network 105, and thus the newly-obtained information can be returned. In addition, when a request for obtaining the information has been received via the network 150, the communication conditions of the network 105 are examined, and a selection may be made between returning the information already obtained in Step 401 and newly obtaining information from the server 106. The conditions of the network 105 when receiving a request to obtain information via the network 150 can be determined based on the response time of a request, the request being sent to the server 106 when the request to obtain the information has been received via the network 150.

Note that in the case where a proxy response is made is Step 409, the request message is forwarded, and the saved information is updated in preparation for the next request.

Descriptions of a system according to a first variation of the present invention shall be given hereinafter with reference to FIG. 5.

Figure 5:
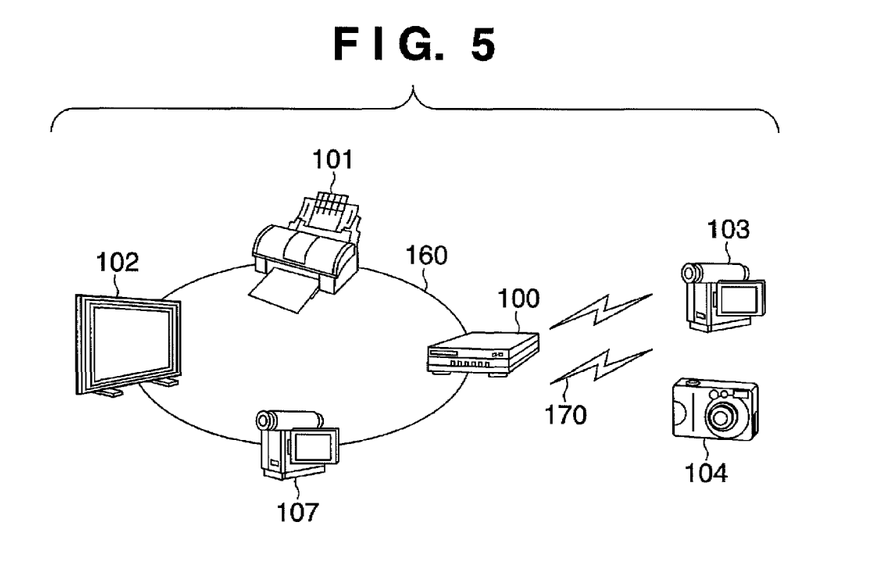
FIG. 5 is a diagram illustrating the configuration of a system embodying the present invention.

FIG. 5 is a diagram illustrating the configuration of the system according to the first variation of the present invention. Here, the message relay device 100 is assumed to have wireless LAN access point functionality.

The printer 101, the digital television 102, and a digital video camera 107 are connected to the message relay device 100 via a wired network 160 using, for example, Ethernet®. Furthermore, a digital video camera 103 and a digital camera 104 are connected to the message relay device 100 via a wireless network 170 using, for example, IEEE 802.11a/b/g/n. The message relay device 100 connects to the networks 160 and 170 and relays messages between the wired network 160 and the wireless network 170.

Bridge and router functions can serve as the wireless LAN access point functionality of the message relay device 100;

however, the present variation can be realized using both functions, and is not intended to be limited to either one.

Note that the configuration of the hardware system of the device (apparatus) is the same as that shown in FIG. 2, and the module configuration of the message relay device 100 is the same as that shown in FIG. 3. However, the network IFs 304 and 305 are connected to the wired network 160 and the wireless network 170, respectively.

<System Process Flow>

Figure 6:
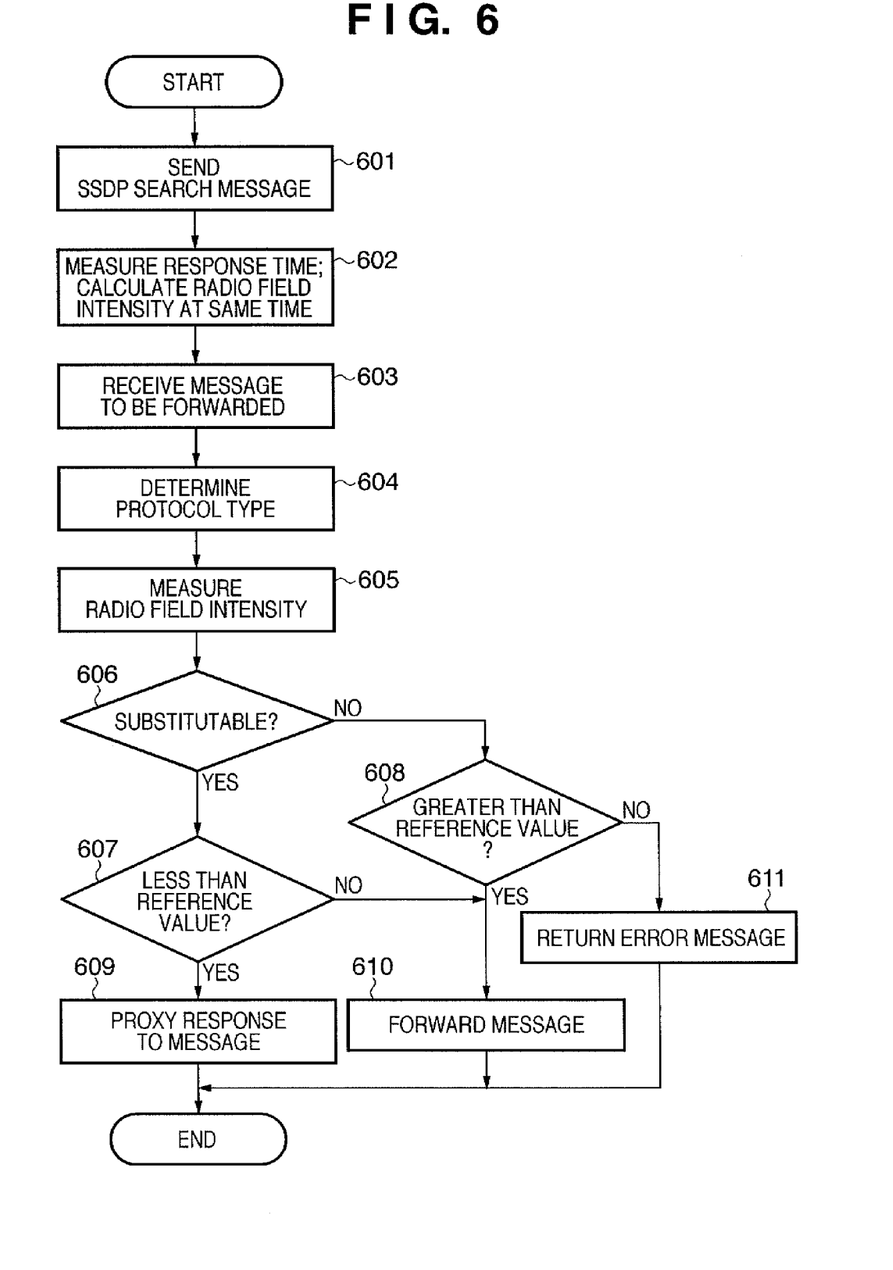
FIG. 6 is a flowchart of a system embodying the present invention.

The flow of the overall process performed by the system according to the first variation of the present invention shall be described with reference to FIG. 6. FIG. 6 illustrates part of the program stored in the ROM 202; this program is a computer program read out by the MPU 206, which is a computer.

Here, the UPnP protocol shall be used as an example. A UPnP protocol message is substituted by the message substitution unit 301 of the message relay device 100. Furthermore, it is assumed that content is circulated and control performed among the printer 101, the digital television 102, the digital video camera 103, and the digital camera 104, which are UPnP-compliant devices. However, although the UPnP protocol is described here as an example, the present invention is not intended to be limited to this protocol.

In Step 601, the message substitution unit 301 sends an SSDP device search message to the wireless network 170. Here, "SSDP" is anagram of Simple Service Discovery Protocol, and is a protocol for searching and discovering UPnP devices present on a network. Next, the message substitution unit 301 receives a response message, and stores the details of the received response message.

In Step 602, the communication condition ascertainment unit 302 measures the time it takes to receive the response, and at the same time measures the radio field intensity (Received Signal Strength Indicator, or RSSI). Here, the communication condition ascertainment unit 302 stores and holds the obtained radio field intensity and the response time. For example, it is assumed that the radio field intensity is 80 and the response time is 1 second.

The UPnP-compliant devices, such as the digital television 102, send, for example, an SSDP device search message. In Step 603, the SSDP device search message is received by the network IF 304, and in Step 604, the communication condition ascertainment unit 302 determines the protocol (message). In Step 605, the communication condition ascertainment unit 302 obtains the radio field intensity at that point in time.

In Step 606, the message processing control unit 300 determines whether or not the protocol determined in Step 604 is substitutable by the message substitution unit 301. If the protocol is substitutable, the procedure moves to Step 607, whereas if the protocol is unsubstitutable, the procedure moves to Step 608.

For example, an SSDP protocol is substitutable because device information can be obtained from the UPnP-compliant device connected to the wireless network in advance. Device description and service description obtainment protocols are also substitutable for the same reason. If the information requested by the message received in Step 603 has already been received in Step 602, the message substitution unit 301 determines that the protocol is substitutable. However, because the control protocol of the device is a message that actually controls the UPnP-compliant device, the message substitution unit 301 determines that the protocol is unsubstitutable.

Note that, while the abovementioned determination is executed in the present embodiment, there are various criteria for determination depending on the protocol, and thus the determination is not intended to be limited to the descriptions provided here. Furthermore, the determination in Step 606 is unnecessary when a protocol that is always substitutable is used, and thus the procedure moves to Step 607 after Step 605.

In Step 607, the procedure moves to Step 609 in the case where the radio field intensity obtained in Step 605 is less than the radio field intensity obtained in Step 602 (or a reference value), whereas the procedure moves to Step 610 in the case where the radio field intensity obtained in Step 605 is greater than the radio field intensity obtained in Step 602. Here, the comparison made in Step 607 is performed based on, for example, the radio field intensities described hereinafter; that is, the lower of the radio field intensities of the digital video camera 103 and the digital camera 104 as measured in Step 602, and the lower of the radio field intensities of the digital video camera 103 and the digital camera 104 as measured in Step 605, are compared. Alternatively, in Steps 602 and 605, the radio field intensity of noise (disturbing waves) aside from the signal sent from the digital video camera 103 and the digital camera 104 may be measured and used in the comparison in Step 607. However, in such a case, if the radio field intensity obtained in Step 605 is greater, the procedure moves to Step 609.

In Step 609, the message substitution unit 301 does not forward the device search message received in Step 603, as a result of it being determined that the protocol determined in Step 604 is substitutable, the radio field intensity is low, and the response time significantly exceeds the aforementioned 1 second. The message substitution unit 301 makes a proxy response instead. In other words, the message substitution unit 301 sends a message including the details of the message received in Step 602 to the source of the message received in Step 603. The message substitution unit 301 sends a response message in response to the message received from the wired network 160 (the digital television 102) based on the communication conditions of the networks 160 and 170.

In Step 610, substitution is possible, and furthermore, the radio field intensity in Step 607 is greater; therefore, it is determined that the chance of the response time being higher than the aforementioned 1 second is low. As a result, the message (device search message) is forwarded by the message relay unit 303 to the wireless network 170 as-is. Upon receiving the message, the digital video camera 103 and the digital camera 104, which are connected to the wireless network 170, return a response. The message relay unit 303 sends that response, via the wired network 160, to the source of the message received in Step 603. In other words, the message relay unit 303 sends, to the wired network 160 (the digital television 102), the message received from the wireless network 170, based on the communication conditions of the networks 160 and 170.

Note that in the case where a proxy response is made is Step 609, the message is forwarded, and the saved information may be updated in preparation for the next search message.

According to another configuration, if the conditions when the message is received from the wireless network 170 in Step 602 are good, it is determined that an appropriate response is to be returned to the source of the message, even if the message received in Step 603 is sent to the wireless network 170. The procedure then moves from Step 607 to Step 610. If the conditions are not good, the procedure moves from Step 607 to Step 609. Here, the source of the message (Step 603) is, for example, the digital television 102. The conditions when the message is received from the wireless network 170 being good refers to, for example, the quality of communication in the wireless network 170 being good. Specifically, this refers to the radio field intensity from the digital video camera 103, the digital camera 104, and so on being stronger than a predetermined value, or the radio field intensity of noise being weaker than a predetermined value. In Step 607, the message processing control unit 300 selects between sending the message received in Step 603 to the wireless network 170 and sending a message to the wired network 160 in accordance with the message received in Step 602. In other words, in Step 607, the message processing control unit 300 selects between forwarding the message and making a proxy response.

In Step 608, if it has been determined in Step 606 that the protocol is unsubstitutable, the procedure moves to Step 610 in the case where the radio field intensity obtained in Step 605 is greater than the radio field intensity obtained in Step 602, whereas the procedure moves to Step 611 in the case where the radio field intensity obtained in Step 605 is lower than the radio field intensity obtained in Step 602.

In Step 611, the protocol is unsubstitutable and the radio field intensity is less, and thus the chance of the response time significantly exceeding the aforementioned 1 second is high; therefore, the message substitution unit 301 returns an error message. The message substitution unit 301 sends an error message in response to the message received from the wired network 160, based on the communication conditions of the networks 160 and 170 and the protocol used by the message received from the digital television 102. In other words, the message substitution unit 301 selects between sending a message to the wired network 160 in accordance with the message received in Step 602 and sending an error message, based on the protocol used by the message received from the wired network 160. To rephrase, the message substitution unit 301 selects between making a proxy response (Step 609) and returning an error message to the network 160 (Step 611), based on the protocol used by the message received from the wired network 160.

Next, descriptions of a system according to a second variation of the present invention shall be given hereinafter with reference to FIG. 7.

Figure 7:
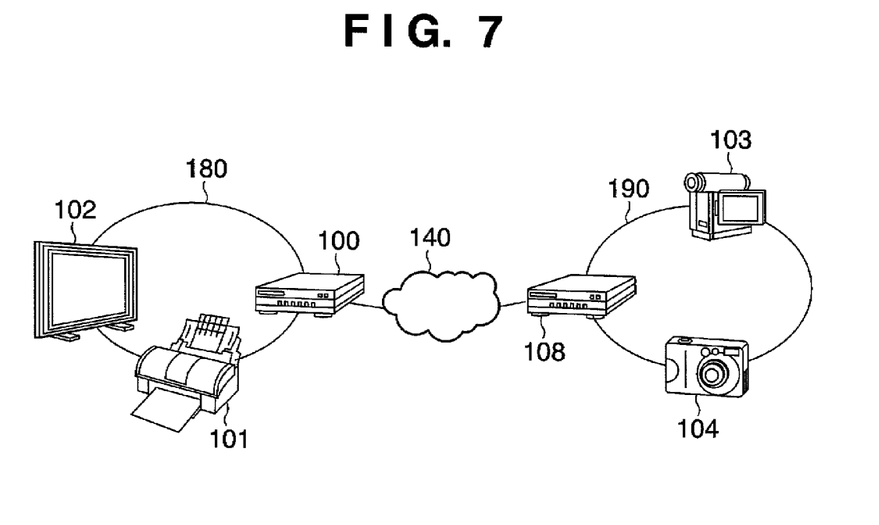
FIG. 7 is a diagram illustrating the configuration of a system embodying the present invention.

FIG. 7 is a diagram illustrating the configuration of the system according to the second variation of the present invention. Here, the message relay device 100 is assumed to have Virtual Private Network (VPN) functionality.

The printer 101 and the digital television 102 are connected to the message relay device 100 via a network 180. Furthermore, the digital video camera 103 and the digital camera 104 are connected to a message relay device 108, which has the same functionality as the message relay device 100, via a network 190. The message relay device 100 and the message relay device 108 are connected to one another via VPN on a network 140.

Note that the configuration of the hardware system of the device (apparatus) is the same as that shown in FIG. 2, and the module configurations of the message relay devices 100 and 108 are the same as that shown in FIG. 3. However, the network IFs 304 and 305 are connected to the network 140.

<System Process Flow>

Here, the UPnP protocol is taken as an example, and a UPnP protocol message is substituted by the message substitution unit 301 of the message relay devices 100 and 108. Furthermore, it is assumed that content is circulated and control performed among the printer 101, the digital television 102, the digital video camera 103, and the digital camera 104, which are UPnP-compliant devices. However, although the UPnP protocol is described here as an example, the present invention is not intended to be limited to this protocol.

The message substitution unit 301 of the message relay device 100 obtains and holds device information of the printer 101 and the digital television 102, which are UPnP-compliant devices connected to the network 180. The message substitution unit 301 of the message relay device 108 obtains and holds device information of the digital video camera 103 and the digital camera 104, which are UPnP-compliant devices connected to the network 190. The message relay devices 100 and 108 exchange device information they hold with one another using the respective message substitution units 301.

Through the abovementioned operations, the message substitution unit 301 of the message relay device 100 connected to the network 180 can perform substitution for the UPnP-compliant devices connected to the network 190. Furthermore, the message substitution unit 301 of the message relay device 108 connected to the network 190 can perform substitution for the UPnP-compliant devices connected to the network 180.

Thereafter, content from the UPnP-compliant devices is circulated and control messages are transmitted between the network 180 and the network 190.

Here, due to the VPN connection being established between the message relay device 100 and the message relay device 108, message substitution is carried out by the message relay device 100 and the message relay device 108, respectively. The processing flow thereof is the same as that shown in FIG. 4.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-055760, filed Mar. 6, 2007, which is hereby incorporated by reference herein in its entirety.

What is claimed is:

1. A transfer apparatus comprising:
   a first receiving unit configured to receive data from a first device via a first network;
   a second receiving unit configured to receive a first request from a second device via a second network;
   a first sending unit configured to send a second request to the first network in accordance with the first request; and
   a second sending unit configured to send, to the second device via the second network, data received from the first device prior to the first request being received, in accordance with the first request, if an error rate of a signal transferred via the second network exceeds a reference value,
   wherein the first sending unit sends the second request to the first network if the error rate is below the reference value.

2. The apparatus according to claim 1, wherein the error rate is an error rate related to receipt of the first request.

3. The apparatus according to claim 1, further comprising a selection unit configured to select, in accordance with the error rate, between (a) sending the second request to the first network and (b) sending, to the second device, the data received from the first device prior to the first request being received.

4. The apparatus according to claim 1, wherein the second sending unit sends, to the second device, the data received from the first device prior to the first request being received, or an error message, in response to the first request.

5. The apparatus according to claim 1, wherein the second sending unit is configured to send, to the second device via the second network, in accordance with the first request and the error rate, a selected one of (a) the data received from the first device prior to the first request being received, and (b) data other than the data received from the first device prior to the first request being received.

6. The apparatus according to claim 1, wherein the second sending unit is configured to send, to the second device via the second network, the data received from the first device prior to the first request being received, in accordance with (a) the first request, (b) the error rate of the signal transferred via the second network, and (c) an error rate of a signal transferred via the first network.

7. The apparatus according to claim 1, wherein the second sending unit is configured to send, to the second device via the second network, the data received from the first device prior to the first request being received, in accordance with (a) the first request, (b) the error rate, and (c) a protocol type used in the first request.

8. The apparatus according to claim 7, wherein, in the case that the protocol type is a substitutable protocol type:
  if the error rate is below the reference value, the first sending unit sends the second request to the first network, and
  if the error rate exceeds the reference value, the second sending unit sends, to the second device, the data received from the first device prior to the first request being received, in response to the first request.

9. The apparatus according to claim 7, wherein, in the case that the protocol type is not a substitutable protocol type:
  if the error rate is below a second reference value, the second sending unit sends, to the second device, the data received from the first device prior to the first request being received, in response to the first request, and
  if the error rate exceeds the second reference value, the second sending unit sends, to the second device, an error message, in response to the first request.

10. A transfer method comprising:
  a first receiving step of receiving data from a first device via a first network;
  a second receiving step of receiving a first request from a second device via a second network;
  a first sending step of sending a second request to the first network in accordance with the first request; and
  a second sending step of sending, to the second device via the second network, data received from the first device prior to the first request being received, in accordance with the first request, if an error rate of a signal transferred via the second network exceeds a reference value,
  wherein, in the first sending step, the second request is sent to the first network if the error rate is below the reference value.

11. The method according to claim 10, wherein the error rate is an error rate related to receipt of the first request.

12. The method according to claim 10, further comprising a step of selecting, in accordance with the error rate, between (a) sending the second request to the first network and (b) sending, to the second device, the data received from the first device prior to the first request being received.

13. The method according to claim 10, wherein in the step of sending the data, the data received from the first device prior to the first request being received, or an error message, is sent to the second device, in response to the first request.

14. The method according to claim 10, wherein in the case that a protocol type of the first request is a substitutable protocol type:
  if the error rate is below the reference value, the second request is sent to the first network, and
  if the error rate exceeds the reference value, the data received from the first device prior to the first request being received, is sent to the second device in response to the first request.

15. The method according to claim 10, wherein in the case that a protocol type of the first request is a non-substitutable protocol type:
  if the error rate is below a second reference value, the data received from the first device prior to the first request being received is sent to the second device in response to the first request, and
  if the error rate exceeds the second reference value, an error message is sent to the second device in response to the first request.

16. A non-transitory storage medium in which a computer program has been stored, the computer program effecting a method comprising:
  a first receiving step of receiving data from a first device via a first network;
  a second receiving step of receiving a first request from a second device via a second network;
  a first sending step of sending a second request to the first network in accordance with the first request; and
  a second sending step of sending, to the second device via the second network, data received from the first device prior to the first request being received, in accordance with the first request, if an error rate of a signal transferred via the second network exceeds a reference value,
  wherein, in the first sending step, the second request is sent to the first network if the error rate is below the reference value.

17. The medium according to claim 16, wherein the error rate is an error rate related to receipt of the first request.

18. The medium according to claim 16, wherein the computer program further comprises a step of selecting, in accordance with the error rate, between (a) sending the second request to the first network and (b) sending, to the second device, the data received from the first device prior to the first request being received.

19. The medium according to claim 16, wherein in the step of sending data, the data received from the first device prior to the first request being received, or an error message, is sent to the second device, in response to the first request.

* * * * *